United States Patent [19]

Cerullo

[11] Patent Number: 5,519,962
[45] Date of Patent: May 28, 1996

[54] ECOLOGICAL ELECTROMECHANICAL DEVICE FOR THE CONTINUOUS, EVEN MULTIPLE, CAPTURE OF NOXIOUS ANIMALS

[76] Inventor: Mariano Cerullo, Via Braccianense, 672, 00060 S. Maria Di Galeria (Province of Rome), Italy

[21] Appl. No.: 333,306

[22] Filed: Nov. 1, 1994

[30] Foreign Application Priority Data

Oct. 13, 1994 [IT] Italy ................. RM94A0659

[51] Int. Cl.⁶ ................................................. A01M 23/10
[52] U.S. Cl. ................................................. 43/72
[58] Field of Search ................... 43/64, 69, 71, 43/72, 73, 74

[56] References Cited

U.S. PATENT DOCUMENTS

| | | |
|---|---|---|
| 125,290 | 4/1872 | Harnish . |
| 546,918 | 9/1895 | Dietz . |
| 1,131,306 | 3/1915 | Wright . |
| 1,244,069 | 10/1917 | Neuneker . |
| 1,384,698 | 7/1921 | Kalemba . |
| 1,752,041 | 3/1930 | Trumbo . |
| 2,110,678 | 3/1938 | Robbins . |
| 2,221,406 | 11/1940 | Paiuk . |
| 2,258,904 | 10/1941 | Murphy ........................ 43/72 |
| 2,471,540 | 5/1949 | Phillips ........................ 43/71 |
| 3,778,923 | 12/1973 | Cuoco . |
| 4,145,834 | 3/1979 | Quigley . |
| 4,241,531 | 12/1980 | Nelson et al. . |
| 4,553,349 | 11/1985 | Tsai . |
| 5,305,545 | 4/1994 | Cerullo . |

FOREIGN PATENT DOCUMENTS

| | | |
|---|---|---|
| 682273 | 10/1939 | Germany . |
| 2152350 | 8/1985 | United Kingdom . |

*Primary Examiner*—Kurt Rowan
*Attorney, Agent, or Firm*—Watson Cole Stevens Davis

[57] ABSTRACT

An ecological, electromechanical device for capturing noxious animals comprising: an upper part (2) on which a cover (1) is just laid and held in a raised position by supporting feet (123); an entrance opening (26) for the animals which is fully free from closing means and doors; rotary trapdoors (3) forming the gangway (40) leading to the baits; a tray (12a) and a trough (12c) containing the baits; rooms (12) accommodating the electromechanisms actuating the capture assembly; a fall room (12b) closed at the lower side by a sealing discharge flap (15) which opens downwards and seals the lower opening of said fall room (12); and a lower part (21) sealed with respect to the upper part and having the function of receiving the captured animals through said sealing discharge flap (15).

15 Claims, 6 Drawing Sheets

FIG.5

ECOLOGICAL ELECTROMECHANICAL DEVICE FOR THE CONTINUOUS, EVEN MULTIPLE, CAPTURE OF NOXIOUS ANIMALS

BACKGROUND OF THE INVENTION

1. Field of the Invention

The present invention relates to the field of the devices for disinfesting town and country environments from mice, rats and other noxious animals.

The serious damage caused by mice and rats in many parts of the world both in the economic and sanitary fields and the continuous necessity of eliminating such worldwide plague are universally known.

This invention is the fruit of ten-years studies, researches and tests about the various, exceptional behaviours particularly of rats in their environment in order to continuously capturing such noxious animals in fast succession, while being compatible with the presence of children and domestic animals.

2. Description of the Related Art

Different kinds of traps such as snares, maze traps, poison-baited traps, and still other traps are presently used for the disinfestation from mice and rats. Such kinds of traps, however, have the drawback not to allow noxious animals to be continuously captured after one another in addition to being often dangerous to other animals and people. Moreover, the use of poison causes environmental problems especially in food stores and granaries where there are also safety problems for people.

A first solution to such problems has been already given by the same Applicant of the present invention with the device disclosed in U.S. Pat. No. 5,305,545 which is embodied in the present description and essentially is based upon preventing the captured animals from emitting olfactory danger signals, for example biological alarm secretions, which could be sniffed by other animals which would escape the danger to be captured. As a result of that the capture of such animals can be repeated indefinitely. The device includes a jointed construction essentially consisting of an upper part comprising an entrance and a decoy and capture assembly, and a lower part for receiving the captured animals. The two parts are detachable from each other and connected by a sealing joint so as to communicate through a sealed discharge flap which opens downwardly into the lower part. In this embodiment, the captured animals reach said discharge flap through a fall room just below the capture assembly which is formed of four rotary, rectangular, continuously operating trapdoors which are placed at 90° to each other and are rotated on one common carrying axle by an electromechanical device actuated in turn by optical or pressure sensing means. The movement of the discharge flap is synchronized with the rotation of the trapdoors.

The above-described device showed a good efficiency in all of the experimented applications, particularly as far as the possibility for the capture to be repeated indefinitely is concerned. Nevertheless some problems have been found such as to limit the use of said embodiment. In particular, the decoy capability as well as the capability of completely overcoming the mistrust of the most cautious exemplars are not quite satisfactory. A further problem consists in the difficulty of removing and transporting the captured animals, a really unpleasant and not hygienic operation.

SUMMARY OF THE INVENTION

The present invention seeks to overcome such problems by providing a capture device having a part containing the bait capable of wafting the smell of the bait to the maximum extent so that on one hand the decoy range is extended, and on the other hand the animals are more attracted to enter the capture device.

Another object of the present invention is that of improving the capability of simultaneously capturing several animals for the deratization of very infested areas.

These objects have been achieved by an electromechanical device for capturing noxious animals of the type already described in the above-mentioned Patent, in which however the cover of the capture device is just laid on the upper part of the device, for example by a hole-and-pin joint formed of holes in the upper part and feet in the cover supporting the latter in a raised position, the cover having also a strip depending therefrom which separates and protects the underlying tray containing the baits from the outer environment and is provided with several holes along its length allowing the decoy smell of the baits to be wafted outside. The animals have a completely free access to the capture area. There are further provided two side openings between the cover and the covering tops of the rooms at both sides of the capture gangway. Such openings reduce the mistrust of the animals which feel them as possible exit ways. In addition, the lower part receiving the captured animals includes a bag having the same dimensions and capacity as said lower part and used as transportation means to take away the captured animals.

The advantages achieved by the present invention consist in a greater capability of capturing animals than the embodiment of prior art in addition to the easier handling of the captured animals to be removed.

BRIEF DESCRIPTION OF THE DRAWINGS

These and other advantages will be more readily understood by anyone skilled in the art on the base of the accompanying drawings and the following description, the drawings and the description of the above-mentioned Patent being integral therewith. Therefore, it will be given a general description of the parts similar as those of the preceding Patent and a detailed description only of the parts forming the object of the present invention.

In the drawings.

DETAILED DESCRIPTION OF THE PREFERRED EMBODIMENTS

In its essential construction a device according to the invention includes:

an upper part 2 comprising: a cover 1; a tray 12a containing the decoy bait; a trough 12c; an opening 26 for the entrance of the animals; four rotary trapdoors 3 mounted on a common axis of rotation at 90° to each other so as to rotate in a horizontal plane; a gangway 40 leading from entrance opening 26 to trough 12c and being opened at the upper side and defined by two rotary trapdoors forming one side wall and the bottom thereof and by a second pivotable side wall 28; sensing means 11 actuating the capture assembly; rooms 12 for receiving the electromechanisms actuating the capture assembly; a fall room 12b closed at the lower side by a sealing discharge flap 15 which opens downward and seals the lower opening of said fall room 12b, the downward opening motion of said discharge flap 15 being suitably timed according to the rotation of trapdoors 3;

a lower part 21 having the function of a container for receiving the captured animals from said sealing discharge flap 15. Said lower part 21 is sealed with respect to the upper part 2 so as to be fully isolated from the outside and is half filled with water mixed with a disinfecting, and partially deodorant, preservative liquid.

According to the present invention, cover 1 rests on the upper part 2 through feet 123 holding said cover in a raised position with respect to the underlying tray 12a containing food, and includes a lower strip 120 depending downwards therefrom which separates and protects tray 12a and the food contained therein from the outer environment. Such strip 120 rests on and follows the outline of the edge of tray 12a and is provided with a number of holes 121 along its length. Advantageously, the raised arrangement of cover 1, which conveniently is of transparent material only at the portion overlying the capture gangway 40 and the later described tops 127 in order to better overcome the mistrust of the most cautious exemplars, along with such provision of protection strip 120 formed with holes 121 allow the smell of the food contained in tray 12a to be wafted outside to the maximum extent.

Figure 1:
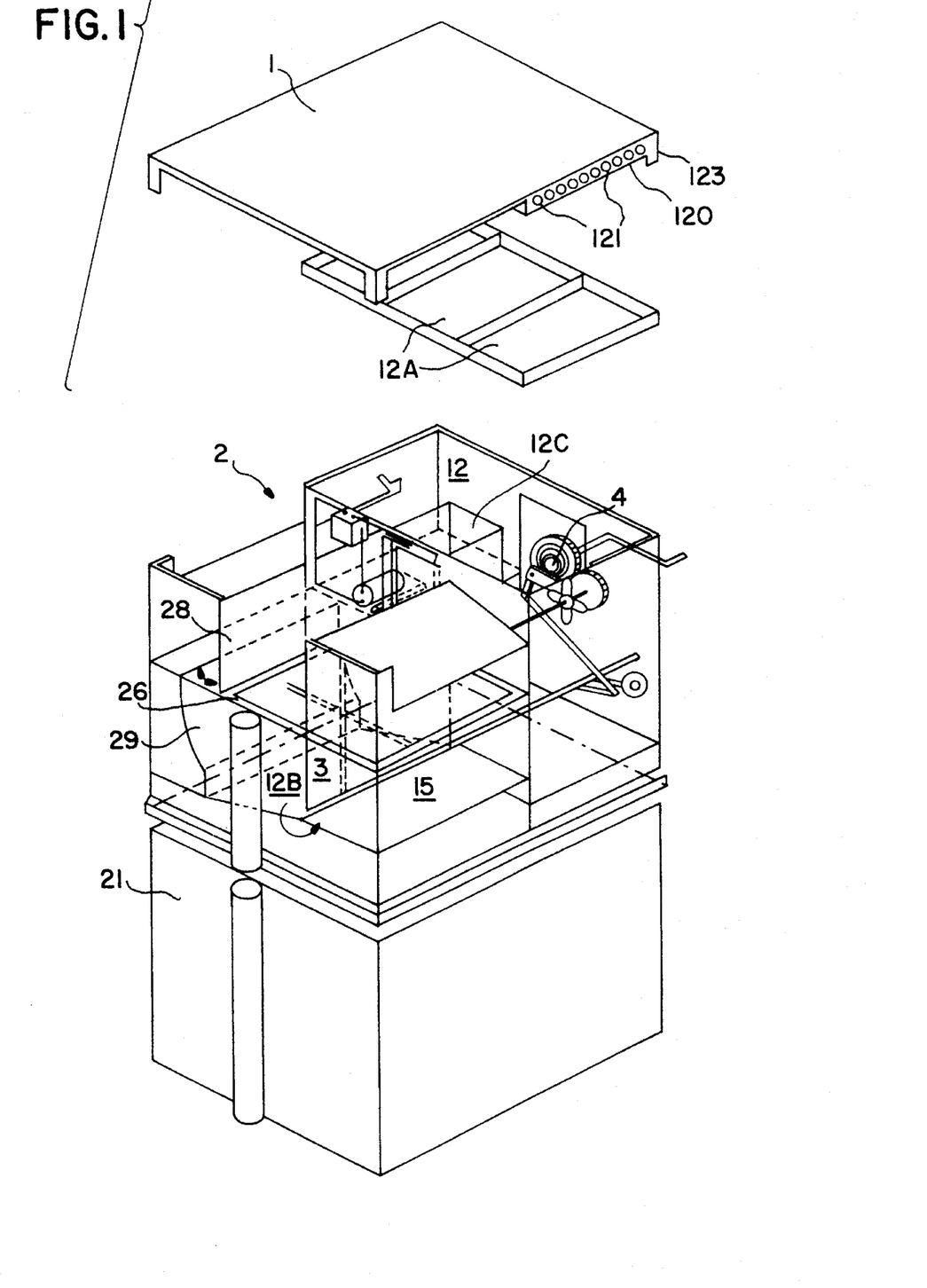
FIG. 1 shows a general view of a first embodiment of the invention.
Figure 2:
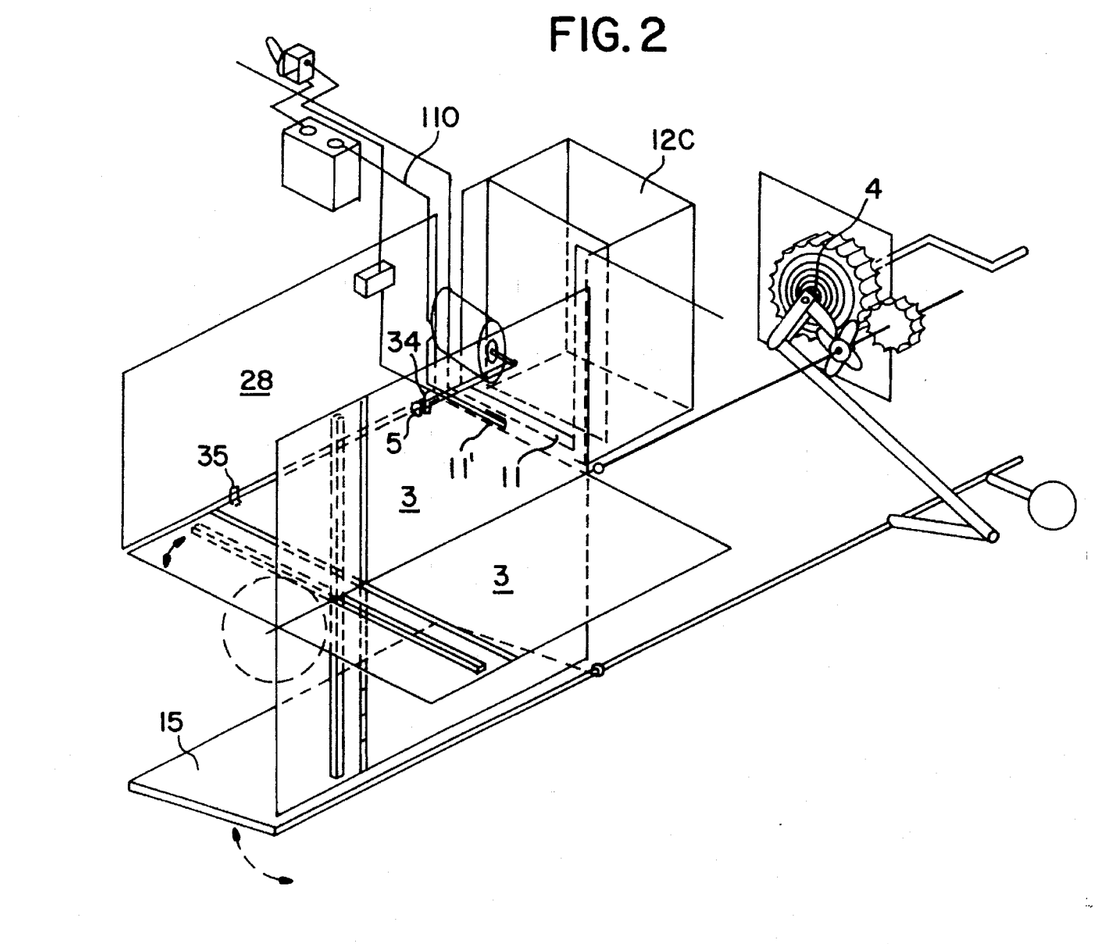
FIG. 2 shows an enlarged view of the capture assembly of the device of FIG. 1.

As can be seen from FIG. 1, opening 26 is fully free from obstacles in order to facilitate the entrance of the animals to the capture area. Moreover, in the embodiment of greater size shown in FIGS. 3 and 5 and provided for bigger animals such as rats, opening 26 leads to a gangway 40 formed into body 2 and limited by a pivotable side wall 28 and by two of the four rotary capturing trapdoors 3 placed at 90° to each other. As mentioned above the four rotary trapdoors 3 are placed at 90° to each other and can rotate stepwise by 90° each time on the common horizontal carrying axle under the action of a leaf spring 4. The 90° stepwise rotation of such trapdoors 3 is controlled by a locking or trigger mechanism 5 which is pushed to and removed from the rotation path under the control of an electronic circuit 110, as thereafter described. Side wall 28 hinged at its horizontal upper side is capable of pivoting outwardly with respect to gangway 40 and is held in a vertical position by a return spring. Locking or trigger mechanism 5 is also provided with one finger 34 which upon operating mechanism 5 pushes back wall 28 so that the latter is pivoted and moved away from trapdoor 3 by such an amount which is sufficient to disengage trapdoor 3 from a second finger 35 which is integral with wall 28 and located in a horizontal plane near the entrance opening 26 under trapdoor 3 and supporting the latter in the resting position so as to prevent any downward yielding of the same under the weight of the animals to be captured. In this way, the sensitivity of the feet of the animals, especially of rats, which would cause them to jump and escape the capture at any yielding of the support plane is overcome.

Figure 3:
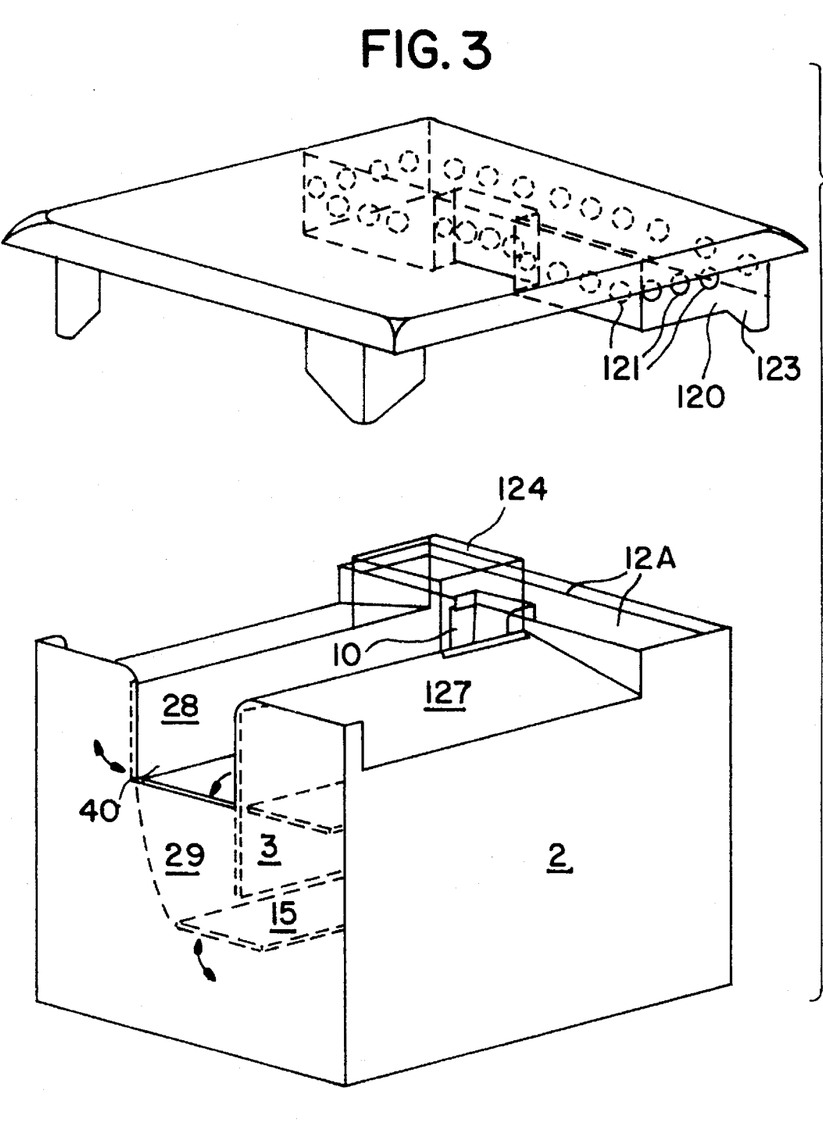
FIG. 3 shows the upper part of the embodiment shown in FIG. 1.
Figure 5:
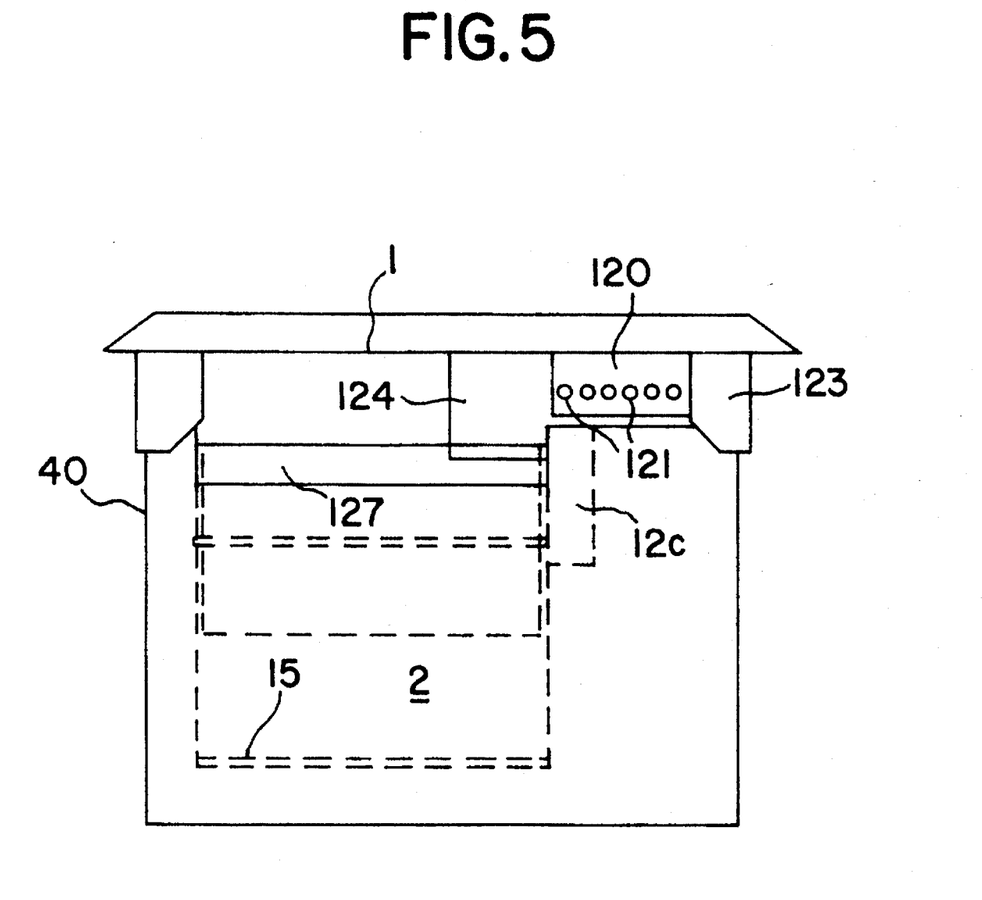
FIG. 5 shows a side view of the device of FIG. 3.

In this embodiment there are provided two side openings between cover 1 and the outwardly inclined tops 127 of the rooms 12 at both sides of the capture gangway 40. With such solution, the ultrasonic signals produced by the rats pass through said openings and cause the rats to feel said openings as potential escape ways so as to increase their bent for entering the capture device overcoming the natural mistrust exhibited especially by the elder exemplars upon entering, particularly by night, narrow ways without exit. In this embodiment, both the tray 12a and strip 120 are near the trough 12c and have smaller size in order to limit walls and constructions which can cause mistrust in the animals.

Figure 6:
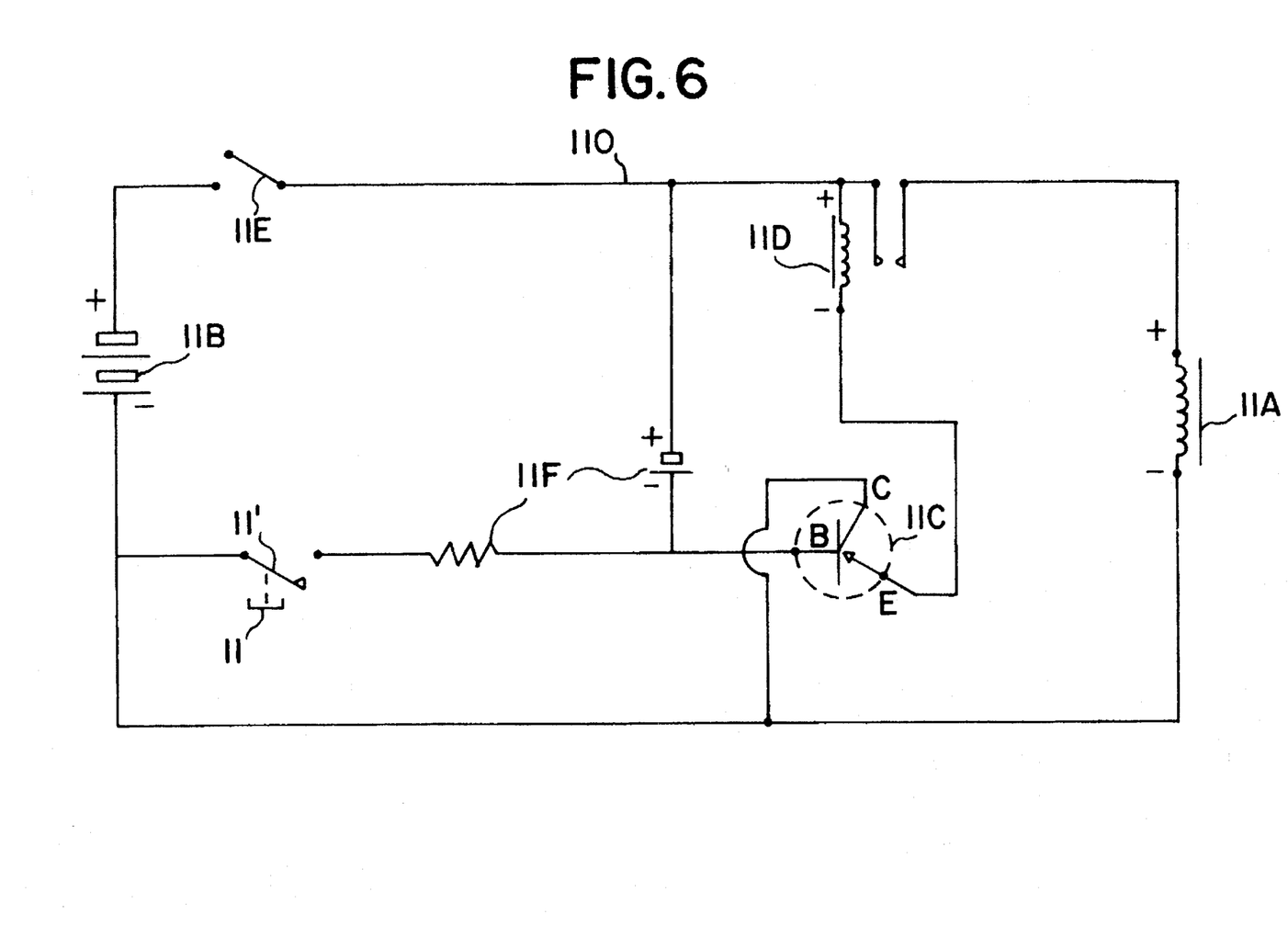
FIG. 6 shows an electronic circuit for actuating the capture assembly of the device.

The raised arrangement of the cover and the presence of said side openings would imply for the sensor door of the above-mentioned preceding patent a greater exposure to the action of the wind so that said centrally hinged sensor door would frequently cause the capture assembly to be actuated unsuccessfully. To this end, according to the device of the present invention such sensor door is replaced by a thin, flexible rectangular blade 11 which is hinged at both ends about pivot pins so as to rotate about a horizontal axis of symmetry and is placed horizontally at the lower edge of window 10 of trough 12c. In order to provide blade 11 with high sensitivity, an electronic circuit 110 shown in FIG. 6 and driving the electromechanical capture assembly is connected thereto. This electronic circuit eliminates the delay in the actuation of the rotary trapdoors due to the transient in the driving solenoid 11A. Upon being lightly touched by an animal, blade 11 comes into contact with a switch 11' which connects power supply 11B to transistor 11C which is then actuated so as to energize relay 11D which connects in turn power supply 11B to solenoid 11A which releases the locking mechanism 5 of trapdoors 3 so as to cause the latter to rotate and then the animal to be captured. The circuit also includes a main switch 11e and a RC group 11F. Therefore, in order to cause such relay 11D to be switched on with the result for the animal to be captured, it is sufficient to apply to any point of such blade 11 a pressure of a few tenths of gram. Upon releasing such contact pressure by the animal, blade 11 opens the circuit 110 with the result of deenergizing relay 11D and solenoid 11A so as to lock the next rotary trapdoor 3 in its capture position.

Further, as can be seen in FIG. 3, above and around window 10 of trough 12c there are also provided screens 124 in the form of protection walls which prevent the animal from reaching directly the bait of the trough 12c from above passing through the openings between cover 1 and tops 127 of rooms 12 without standing on the trapdoor. Following this way the animal could actuate the sensing means with the result of escaping the capture or being momentarily caught between a trapdoor 3 and the upper part of wall 28. Advantageously, said screens 124 have small size and are of transparent material so as not to arouse the mistrust of the animal.

Figure 4:
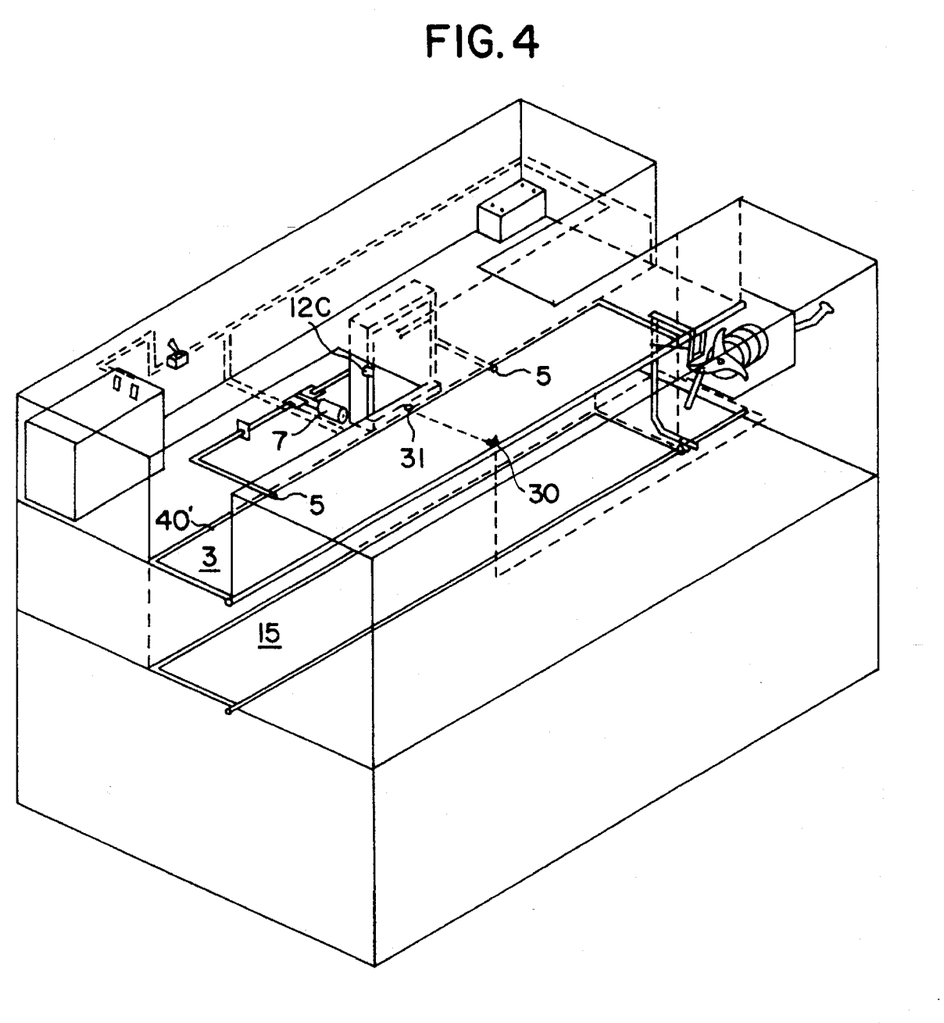
FIG. 4 shows a further embodiment of the invention.

In the further embodiment shown in FIG. 4 and particularly designed for shops and stores of foodstuffs, entrance opening 26 gives admittance to an open gangway 40' passing through the device from one end to the other end and provided at its centre on both sides with infrared ray sensors 30, 31 which are invisible to mice, rats, and other animals, and are placed at a side trough 12c. Particularly, this embodiment for shops and stores is located along raised paths preferably followed by animals to reach foodstuffs. With such arrangement the decoy function of the baits contained in the tray within the device is supported by the foodstuffs stored in the shop and located at both ends of through gangway 40'. Advantageously, the passage through the infrared ray sensors allows also not hungry or very cautious animals to be captured. In addition, the use of infrared ray sensors allows also bugs such as cockroaches, beetles and the like to be captured, as they would not have a sufficient weight to actuate a pressure sensor.

In all of the disclosed embodiments the capture process, unchanged with respect to the solution disclosed in the above-mentioned patent, provides that the preys fall through the fall room 12b to discharge flap 15. Fall room 12b is provided with a side wall 29 suitably shaped like a slide ending at the closure edge of discharge flap 15 so as not to give the falling animal any grip. Further, side wall 28 of the capture gangway 40 is hinged at the upper side so as to rotate outwardly, thus preventing the falling animals from being catched between the rotary trapdoors and said wall 28 with the result of discontinuing the capture process of the device.

In the disclosed preferred embodiments the shape of the device is such as to make access means to the opening 26 necessary. Such access means may be formed of a slope, as described in the above-mentioned patent, or preferably a flight of stair along which baits may be placed until the entrance opening 26. With such solution the animals following the first incoming animals and founding traces of consumed baits are less suspicious and enter the capture device without difficulty. Moreover, in order to increase the number of the captured animals, it is advisable to locate the entrance opening of the device at the level of any raised surface, where possible, as the rats prefer such raised ways to reach food.

Once fallen into container 21 the animals are immersed in a disinfecting, and partially deodorant, preservative liquid. When container 21 has to be emptied, a bag is provided having the same dimensions and capacity as said container 21 and located in the container just below discharge flap 15 so as to remove the captured animals without any direct contact therewith. This bag is provided with a closing lace and is perforated for allowing water to be drained.

In a further preferred embodiment, in case of very infested areas a number of upper sunburst-placed sections 2 having only one power supply and only one lower container 21 of suitable capacity may be provided.

Further, a counter is provided which allows the number of captured animals to be controlled in order to provide for emptying container 21.

Finally, the materials of the parts contacting the animals (gangway 40, tops 127, and so on) should not be porous, for example Formica®, in order not to be impregnated with the biological odours of the captured animals.

The details of construction may be changed by those skilled in the art as far as shape, size, location of the components and type of materials is concerned as well as, for example, a container 21 suitable to keep the captured animals alive for any future use may be provided without departing from the scope of the inventive spirit and remaining within the limits of protection of the present industrial invention.

I claim:

1. An ecological, electromechanical device for continuously capturing noxious animals comprising: a cover (1); an upper part (2) in which an entrance opening (26) for the animals is provided; four rotary trapdoors (3) placed at 90° to each other; a gangway (40) leading from entrance opening (26) to a trough (12c); sensing means (11, 30, 31) actuating the capture assembly; a tray (12a) for containing decoy bait; a trough (12c); rooms (12) which accommodate electromechanisms actuating the capture assembly; a fall room (12b) closed at the lower side by a sealing discharge flap (15) which opens downwardly; and a sealed lower part (21) receiving the captured animals; characterized in that said cover (1) is just laid on the upper part (2) by a hole-and-pin joint and is provided with feet (123), raising it from the underlying tray (12a) containing said bait, and with a lower strip (120) depending downwards therefrom and having holes (121) for wafting the smell of said bait into the outer environment, said strip (120) resting on and following the outline of the edge of said tray (12a), and in that said entrance opening (26) is free of any obstacle and without closure means.

2. The device according to claim 1, characterized in that the opening (26) gives admittance to a gangway (40) which is formed in the body (2), is defined by two trapdoors (3) at 90° to each other and a side wall (28) and is covered by cover (1) located in a raised position with respect to the side walls of gangway (40) so as to form side openings which are provided between the cover (1) and the suitably inclined outwardly tops (127) of the rooms (12) at both sides of gangway (40), said side openings being felt by the animals as potential exit ways.

3. The device according to claim 1, characterized in that said tray (12a) and said strip (120) resting thereon are located above trough (12c) at the end of gangway (40).

4. The device according to claim 1, characterized in that a side wall (28) of said gangway (40) is hinged at the upper side and can rotate outwardly in order to prevent the body of the falling animals from being caught between the trapdoor and said wall (28), thus discontinuing the capture process.

5. The device according to claim 1, characterized in that said side wall (28) is provided with a finger (35) located in a horizontal plane at the lower side thereof so as to engage and support the horizontal trapdoor (3) in the resting position of the latter.

6. The device according to claim 1, characterized in that said gangway (40) has protection screens (124) located above and around said window (10) of said trough (12c) in order to prevent the animals from reaching the baits directly from above without standing on the trapdoor (3), thus avoiding the capture, said screens being of transparent material in order not to arouse the mistrust of the animals.

7. The device according to claim 1, characterized in that the side wall (29) of said fall room (12b) is shaped like a slide ending exactly at the closure edge of the discharge flap (15).

8. The device according to claim 1, characterized in that a number of upper parts (2) are provided which are connected to only one power supply and to only one container (21) of suitable size for the captured animals.

9. The device according to claim 1, characterized in that said sensing means is formed of a thin, flexible blade (11) supported by pivot pins at both ends and placed horizontally at the lower edge of window (10) of trough (12c), said blade (11) being capable of coming into contact with a switch (11') of an electronic circuit (110) for actuating the capture electromechanism so that a light pressure on any point of blade (11) is sufficient to switch on the electronic circuit (110) and to operate the capture device.

10. The device according to claim 1, characterized in that the sensing means actuating the capture mechanism is an infrared ray sensor (30, 31) located at the centre of an open through gangway (40') placed along the paths followed by the animals to reach the foodstuffs in the environment to be deratized.

11. The device according to claim 1, characterized in that in order to remove the captured animals there is provided a disposable perforated bag which essentially has the shape and the size of container (21) and is immersed in the disinfecting, and partially deodorant, preservative liquid contained in said container (21) just below the discharge flap (15).

12. The device according to claim 1, characterized in that there is provided a counter of the captured animals connected to the axis of rotation of the rotary trapdoors.

13. The device according to claim 1, characterized in that the walls contacting the animals are of non-porous material, for example Formica®.

14. The device according to claim 1, characterized in that in order to increase the sensitivity of the capturing device the trapdoors (3) are operated by an electronic circuit (110) which is operated by a switch (11') coming into contact with said blade (11) touched by the animal and actuating a transistor (11C) which supplies a relay (11D) with the excitation current causing the latter to operate a solenoid (11A) for controlling the locking and release mechanism (5) of trapdoors (3).

15. The device according to claim 9, characterized in that in order to increase the sensitivity of the capturing device the trapdoors (3) are operated by an electronic circuit (110) which is operated by a switch (11') coming into contact with said blade (11) touched by the animal and actuating a transistor (11C) which supplies a relay (11D) with the excitation current causing the latter to operate a solenoid (11A) for controlling the locking and release mechanism (5) of trapdoors (3).

* * * * *